(12) United States Patent
Kessel et al.

(10) Patent No.: US 11,468,029 B2
(45) Date of Patent: Oct. 11, 2022

(54) EVOLUTION OF COMMUNITIES DERIVED FROM ACCESS PATTERNS

(71) Applicant: NETAPP, INC., Sunnyvale, CA (US)

(72) Inventors: Omri Kessel, Waban, MA (US);
Shailaja Kamila, Bangalore (IN);
Pratyush Uppuluri, Bangalore (IN);
Jayanta Basak, Bangalore (IN)

(73) Assignee: NETAPP, INC., San Jose, CA (US)

( * ) Notice: Subject to any disclaimer, the term of this patent is extended or adjusted under 35 U.S.C. 154(b) by 520 days.

(21) Appl. No.: 16/297,521

(22) Filed: Mar. 8, 2019

(65) Prior Publication Data

US 2020/0233844 A1 Jul. 23, 2020

(30) Foreign Application Priority Data

Jan. 21, 2019 (IN) .............................. 201941002499

(51) Int. Cl.
*G06F 16/22* (2019.01)
(52) U.S. Cl.
CPC ................................ *G06F 16/2255* (2019.01)
(58) Field of Classification Search
CPC ............. G06F 16/2255; G06F 16/2372; G06F 16/2379
USPC ....................................................... 707/747
See application file for complete search history.

(56) References Cited

U.S. PATENT DOCUMENTS

| 9,361,627 | B2 * | 6/2016 | Chang | G06Q 50/01 |
| 11,030,265 | B2 * | 6/2021 | Wang | G06F 16/2228 |
| 2011/0087669 | A1 * | 4/2011 | Ancin | G06F 16/325 707/740 |
| 2012/0046995 | A1 * | 2/2012 | Petersen | H04W 4/029 705/7.33 |
| 2014/0222821 | A1 * | 8/2014 | Kelmenson | G06Q 10/1095 707/740 |

* cited by examiner

*Primary Examiner* — Allen S Lin
(74) *Attorney, Agent, or Firm* — Haynes and Boone, LLP

(57) ABSTRACT

A system, method, and machine-readable storage medium for resolving a candidate community are provided. In some embodiments, a method includes obtaining a candidate community and a neighbor set for the candidate community, the neighbor set including zero or more stable communities. The method also includes resolving the candidate community as being a new stable community if the neighbor set is empty. The method further includes resolving the candidate community as being part of a matching stable community if a hash value of the candidate community matches a hash value of one or more stable communities included in the neighbor set. The method also includes resolving the candidate community as being a new stable community if an entropy value is greater than a threshold, the entropy value being based on the candidate community and the neighbor set.

15 Claims, 6 Drawing Sheets

EVOLUTION OF COMMUNITIES DERIVED FROM ACCESS PATTERNS

CROSS REFERENCE TO RELATED APPLICATIONS

The present application claims priority to and the benefit of the India Patent Application No. 201941002499 filed Jan. 21, 2019, which is hereby incorporated by reference in its entirety as if fully set forth below and for all applicable purposes.

TECHNICAL FIELD

The present description relates to resolving communities of users based on entity access patterns, and more specifically, to a system, method, and machine-readable storage medium for resolving a candidate community with stable communities stored in a distributed storage system for, e.g., cost savings, data security, and/or cost management.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Improvements in distributed storage have given rise to a cycle where applications demand increasing amounts of data delivered with reduced latency, greater reliability, and greater throughput.

Operational teams across enterprise organizations face the challenge of handling data that is ever increasing in size and spread across a mix of on-premise and cloud-based data sources and ensuring that their data is secure. For understanding complex systems with large amounts of data and users, communities may be formed. Historically, a community has corresponded to groups of nodes in a graph (e.g., network depicted as graph), e.g., a set of nodes that is more densely connected to each other than the rest of the network nodes. A popular use of communities is a social network in which users connect with each other, and community extraction in social networks results in connected subgraphs (e.g., social circles).

Current approaches, however, do not take into account the actual attributes that are common to the nodes when detecting and generating communities. Rather, current approaches are limited in that they focus only on the connections between nodes. Moreover, problems arise when communities are re-generated periodically in reconciling the newly-generated communities with the previous set of communities generated at a prior period. Without reconciling communities between time periods, it is difficult to track the evolution of communities over time to facilitate the detection of possibly anomalous situations.

BRIEF DESCRIPTION OF THE DRAWINGS

The present disclosure is best understood from the following detailed description when read with the accompanying figures.

DETAILED DESCRIPTION

Figure 1:
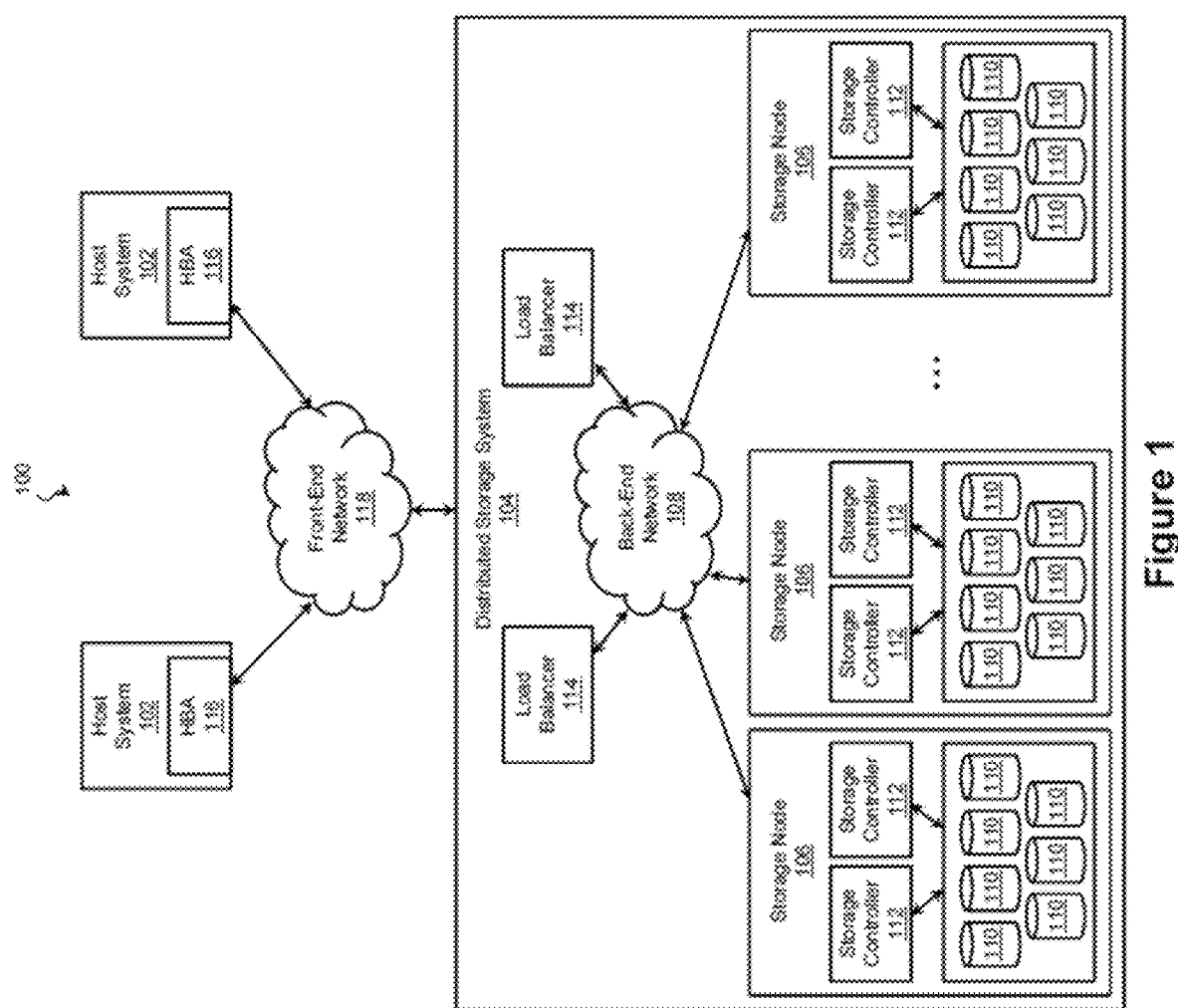
FIG. 1 is a schematic diagram of a computing architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

Operational teams across enterprise organizations face the challenges of handling a vast amount of data stored in different data storage centers and spread across a mix of on-premise and cloud-based data sources. The amount of data stored and handled by enterprise organizations continues to grow. An enterprise organization may have many departments, with users in the same departments typically accessing the same files as each other. For example, employees in the Human Resources (HR) department tend to access the same files as each other. In another example, engineers working on the same project tend to access the same files as each other.

An entity represents any arbitrary unit of data regardless of whether it is organized as an object, a file, a directory, or a set of blocks. It may be desirable to track and identify usage patterns of users to detect anomalies based on membership in communities. A community may be defined as including a set of users (e.g., in an organization) who have accessed a common set of entities (e.g., files, directories, objects, etc. according to embodiments of the present disclosure) over a defined time-period.

As users access different entities over time and users' projects change, the entity access patterns may change. The present disclosure provides techniques for tracking an evolution of communities derived from access patterns. In an example, a community detection system may track an evolution of communities by resolving a candidate community with stable communities stored in a distributed storage system for, e.g., cost savings, data security, and/or cost management, as will be further explained below. The term "candidate community" may refer to a new community that is to be resolved with respect to any prior communities (e.g., from a prior time window). The term "stable community" may refer to a community that has already been resolved and is stored in a database (e.g., from a prior time window).

A community detection system may perform various actions to resolve candidate communities with stable communities. The community detection system may observe new accesses of entities by users within a subsequent time window. For example, during the subsequent time window, users may access entities and the community detection system may form new communities based on the new accesses. Accordingly, the number of communities may increase and/or user membership within a community may change. Rather than create new communities, the community detection system resolves the new candidate communities with stable communities to determine whether to resolve a candidate community as being a new stable community or as being part of a matching stable community. Such reconciliation may provide for more concise user-community relationships and the ability to detect malicious use using these relationships.

In some examples, the community detection system obtains a candidate community and a neighbor set for the candidate community. The neighbor set may include zero or more stable communities. In an example, the community detection system may resolve the candidate community as being a new stable community in response to a determination that the neighbor set is empty. In this example, no stable communities are determined to be close enough to the candidate community and accordingly, the community detection system resolves the candidate community as being a new stable community.

In another example, the community detection system may resolve the candidate community as being part of a matching stable community if a hash value of the candidate community matches a hash value of one or more stable communities included in the neighbor set. In this example, the candidate community may be determined to be already present in the stable community. The community detection system may calculate a hash value of the user string included in the respective stable community for comparison purposes.

In another example, the community detection system may resolve the candidate community as being a new stable community in response to a determination that an entropy value is greater than a threshold and a determination that the neighbor set includes a plurality of stable communities, where the entropy value is based on the candidate community and the neighbor set. Alternatively, the community detection system may resolve, based on a distance between the candidate community and each stable community included in the neighbor set, the candidate community as a new stable community or as being part of a matching stable community in response to a determination that the entropy value is not greater than the threshold.

After one or more communities are formed, a system may consider the community to which a user belongs as a baseline that provides insight into other users' activities (e.g., for use in detection anomalous use). For example, if a user belonging to a community has increased her access rates for a given set of files and other users belonging to the same community have also increased their access rates for the given set of files, it may be determined that the user's behavior is not suspicious, given the access rates of other users in the community. If, however, only the user's access increases without a proportional increase in other users' access rates, the user's behavior may be flagged as suspicious. By using communities in such a way, the individual user's behavior may more accurately be put in context relative to other users in the same community. In other words, each individual user may have varied access rates (e.g., high, low, or medium, etc.), but as the collective behavior of a community (that a given user is a part of) changes (e.g., all users in the community have increased their access rates), it may be determined that the behavior is not suspicious behavior.

FIG. 1 is a schematic diagram of a computing architecture 100 according to aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID system, an OpenStack Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some exemplary embodiments, the storage nodes 106 are coupled by a TCP/IP back-end network 108, which is local to a rack or datacenter, although additionally or in the alternative, the network 108 may extend between sites in a WAN configuration or be a virtual network extending throughout a cloud. The storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and other considerations.

In the illustrated embodiment, the computing architecture 100 includes a plurality of storage nodes 106 in communication with a plurality of hosts 102. It is understood that for clarity and ease of explanation, only limited number of storage nodes 106 and hosts 102 are illustrated, although the computing architecture 100 may include any number of hosts 102 in communication with a distributed storage system 104 containing any number of storage nodes 106. An exemplary storage system 104 receives data transactions (e.g., requests to read and/or write data) from the hosts 102 and takes an action such as reading, writing, or otherwise accessing the requested data so that storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure, and likewise appear to be directly connected (local) to the hosts 102.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. Virtualization includes mapping physical addresses of the storage devices into a virtual address space and presenting the virtual address space to the hosts 102, other storage nodes 106, and other requestors. In this way, the storage node 106 represents the group of devices as a single device, often referred to as a volume. Thus, a requestor can access data within a volume without concern for how it is distributed among the underlying storage devices 110.

Further, an exemplary storage node 106 may be connected to one or more cloud storage providers of varying levels (e.g., standard cloud storage or lower-class cloud storage, or both, for example S3 or GLACIER storage classes). The cloud storage node 106 may exercise protocol-level control over the allocated cloud storage space available to it on behalf of the hosts 102. Such control may be via one or more protocols such as HTTP, HTTPS, etc.

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally, or in the alternative, a host 102 may initiate a data transaction by contacting one or more of the storage nodes 106 directly rather than contacting the load balancer 114.

Turning now to the hosts 102, a host 102 includes any computing resource that is operable to exchange data with the distributed storage system 104 by providing (initiating) data transactions to the distributed storage system 104. In an exemplary embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to the load balancer 114 or to a storage node 106 directly via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

As described above, the storage system 104 may distribute the hosts' data across the storage nodes 106 for performance reasons as well as redundancy. The distributed storage system 104 may be an object-based data system. The storage system 104 may be a distributed object store that spans multiple storage nodes 106 and sites. Object-based data systems provide a level of abstraction that allows data of any arbitrary size to be specified by an object identifier. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3.

An entity represents any arbitrary unit of data regardless of whether it is organized as an object, a file, a directory, or a set of blocks. Enterprise data is spread across hybrid data sources. Entities may be stored in the distributed storage system 104 and accessed by users. To secure the data, it may be desirable to track the data usage patterns for each user. For example, if a user accesses an entity, this event may be logged in a community/anomaly detection system. A community may be defined as including a set of users (e.g., in an organization) who have accessed a common set of entities (e.g., files, directories, objects, etc. according to embodiments of the present disclosure) over a defined time-period. Accordingly, users of a community have a set of common attributes (e.g., accessed a common set of entities).

A community may adhere to one or more principles. A first principle may be that communities that are formed are based on a common set of attributes (e.g., common set of entities accessed by users). Accordingly, the communities are formed based on actual entities access by the users, and not based on connectivity between users quantified by a metric. A second principle may be that a user may belong to multiple communities. Accordingly, communities may be overlapping as users are common to various communities. A third principle may be that the number of communities to be formed need not be determined a priori. A fourth principle may be that the community formation is deterministic. For example, given the same input (e.g., entity access patterns), the same communities are generated. A fifth principle may be that a community may be formed and updated in real-time in accordance with users' access of entities stored in the distributed storage system 104. A sixth principle may be that the steps performed for forming a community are computationally efficient.

Figure 2:
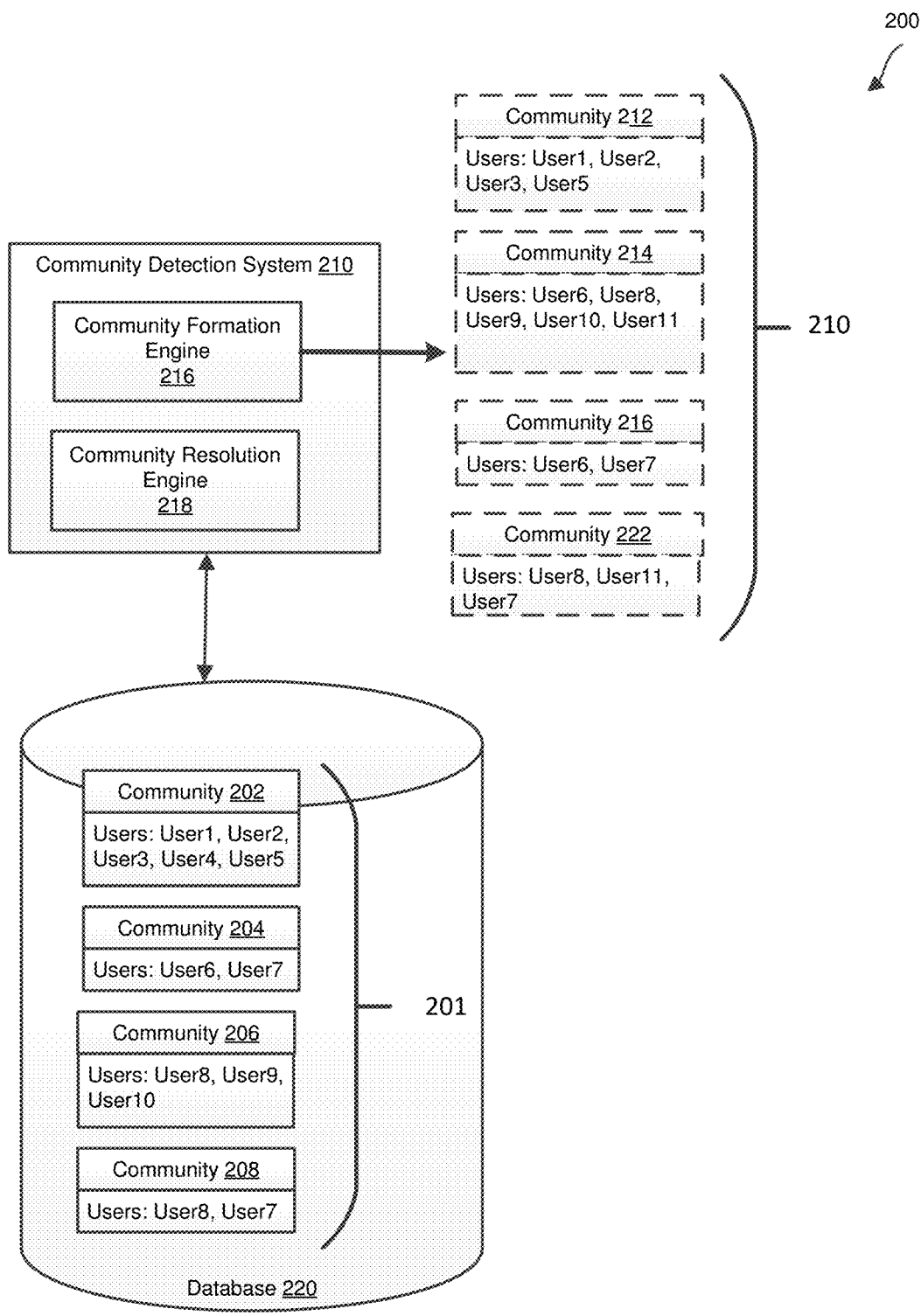
FIG. 2 is a schematic diagram of a computing architecture according to aspects of the present disclosure.

FIG. 2 is a schematic diagram of a computing architecture 200 according to aspects of the present disclosure. For example, the computing architecture 200 may be, in some examples, implemented as part of the distributed storage system 104. The computing architecture 200 includes a community detection system 210 that protects data from malicious use due, e.g., to insider threats or compromised users (to name just a few examples). In some examples, aspects of the community detection system 210 are incorporated in the storage controllers 112. In some examples, the community detection system 210 may be embodied as a server or other computing device that is coupled to the back-end network 108 in FIG. 1 and may detect communities of users from entity access patterns by the users. Data describing the entities may be stored in the storage devices 110 of the storage nodes 106 in FIG. 1 and accessed by the users. The community detection system 210 includes a community formation engine 216 and a community resolution engine 218. The community formation engine 216 may form one or more communities, each including a set of users and a set of entities accessed by the users. Examples of the formation and generation of communities are described in India Patent Application No. 201941002412 to Kessel et al., filed Jan. 19, 2019, entitled "Community Generation Based on a Common Set of Attributes," which is incorporated herein by reference in its entirely. This reference discloses examples of formation and generation of communities based on entity access patterns. In an example, a community may be formed by detecting and generating communities of users based on a common set of entities stored in the distributed storage system 104. In an example, a list of entities associated with a plurality of users is obtained, and at least one user of the plurality of users has accessed an entity in the list of entities. Each of the users in a community has accessed each of the entities included in the same community, providing a tight and cohesive relationship between the users and entities included in the same community.

The community formation engine 216 may observe accesses of entities, which may be stored in the storage devices 110, by users within a time window and form one or more communities based on the accesses. For example, for purposes of illustrating embodiments of the present disclosure, during a time-period $TP_1$, the community formation engine 216 may form a first set of communities 201 including a community 202 including User1, User2, User3, User4, and User5; a community 204 including User6 and User7; a community 206 including User8, User9, and User10; and a community 208 including User8 and User7. The community formation engine 216 may store the information about the communities 202, 204, 206, and 208 into a database 220. The database 220 stores community information specifying, among other information, which users belong to which communities.

As the time window shifts, the community formation engine 216 may again observe new accesses of entities by users within the subsequent time window. For example, during the subsequent time window, users may access entities and the community formation engine 216 may form new communities based on the new accesses. Accordingly, the number of communities may increase and/or user membership within a community may change.

It may be undesirable to continue to create new communities without reconciling them with the previous communities 202, 204, 206, and 208 that have already been saved and stored in the database 220. Such reconciliation may provide for more concise user-community relationships and the ability to detect malicious use using these relationships. For example, the community resolution engine 218 may also assist in identifying anomalies in users' access rates as compared to a baseline of the community to which the user belongs, by closely reflecting the reality regarding how users operate in the community. Further, reconciliation of communities between time windows may aid in identifying anomalous increases in community size.

For example, during a time-period $TP_2$, which is after the time-period $TP_1$, the community formation engine 216 may form a set of candidate communities 210 including a candidate community 212 including User1, User2, User3, and User5; a candidate community 214 including User6, User8, User9, User10, and User11; a candidate community 216 including User6 and User7; and a candidate community 222 including User8, User11, and User7. The community resolution engine 218 may resolve each candidate community taking into consideration information from previous runs. In the present disclosure, the term "candidate community" may refer to a new community that is to be resolved with respect to any prior communities (e.g., from a prior time window). The term "stable community" may refer to a community that has already been resolved and is stored in the database 220 (e.g., from a prior time window).

Figure 3:
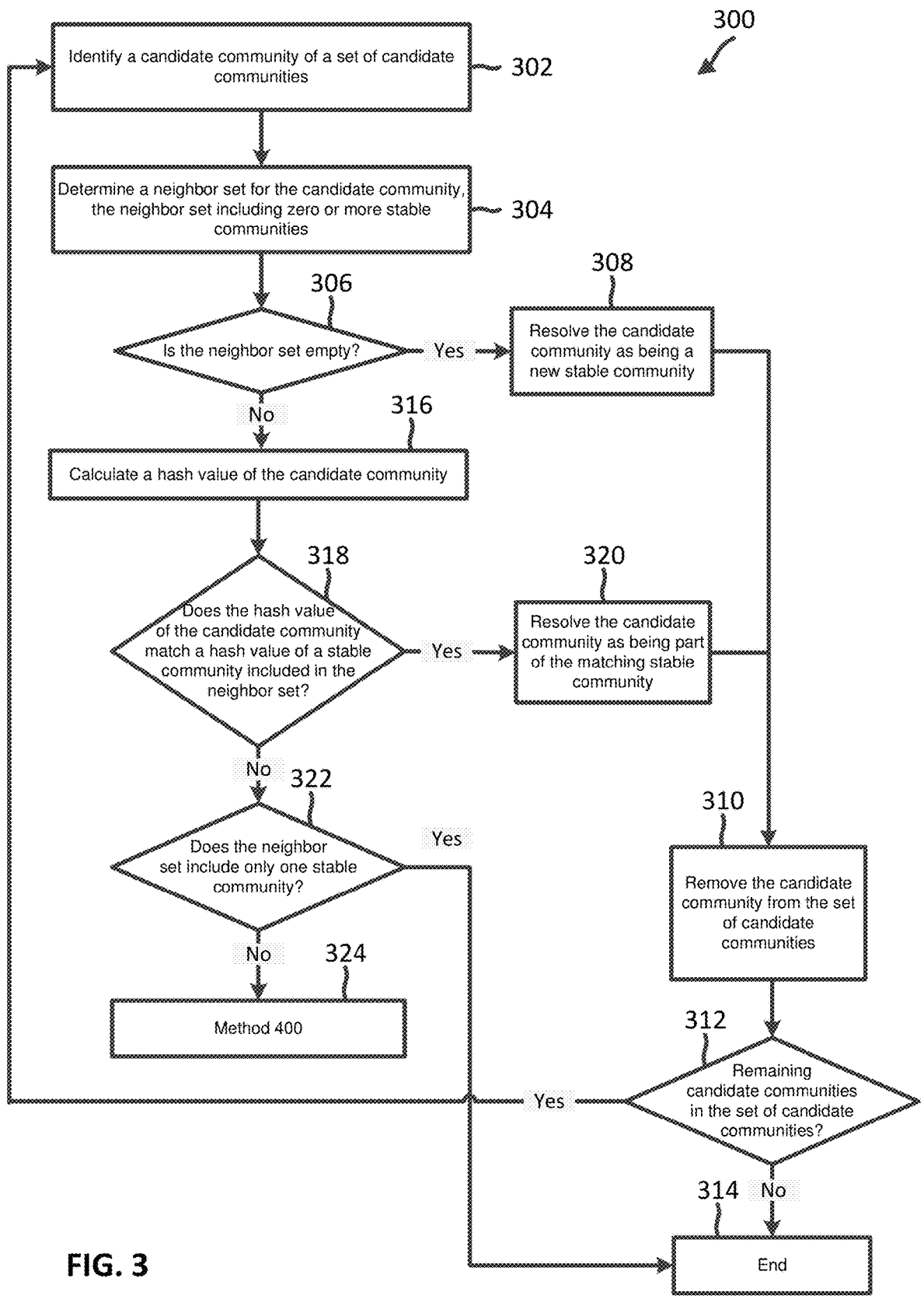
FIG. 3 is a flow diagram of a method of resolving one or more candidate communities according to aspects of the present disclosure.

FIG. 3 is a flow diagram of a method 300 of resolving one or more candidate communities according to aspects of the present disclosure. Steps of the method 300 can be executed by a computing device (e.g., a processor, processing circuit, and/or other suitable component) or other suitable means for performing the steps. For example, the community detection system 210 may utilize one or more components to execute the steps of method 300.

As illustrated, the method 300 includes a number of enumerated steps, but embodiments of the method 300 may include additional steps before, after, and in between the enumerated steps. In some embodiments, one or more of the enumerated steps may be omitted or performed in a different order. Additionally, the method 300 may be suitable for different domains that form candidate communities for resolution with stable communities. The resolution may be used in a variety of further contexts to the examples discussed herein, including in social circles, or any context in which a quantitative measure is defined with respect to one or more attributes of users in a community (e.g., single attribute and metric, where a matrix norm is applicable) or in a context that defines a custom distance metric.

To aid in understanding aspects of the method 300, FIG. 3 will be discussed in relation to FIG. 2. Referring to block 302 of FIG. 3, the community detection system 210 (e.g., via the community resolution engine 218) may identify a candidate community 212 of the set of candidate communities 210. This occurs, for example, in response to the community formation engine 216 forming the set of candidate communities 210 at the end of a time window. This may repeat at the end of each time window with resolution occurring with respect to the set from the prior time window.

Referring to block 304 of FIG. 3, the community detection system 210 (e.g., via the community resolution engine 218) may determine a neighbor set for the candidate community, the neighbor set including zero or more stable communities (i.e., one or more communities existing from a prior time window). A neighbor set corresponding to a candidate community includes one or more stable communities identified as having a high number of commonalities with the candidate community (e.g., if the minimum number of commonalities of users between the candidate and stable communities is one).

The database 220 stores information about users and the stable communities to which the users belong. In an example, for each user included in the candidate community 212, the community resolution engine 218 may submit a query to the database 220 for stable communities to which each of the users belonged. Referring back to FIG. 2 for an example, the candidate community 212 includes users {User1, User2, User3, and User5}. The community resolution engine 218 may identify User1, User2, User3, and User5 as belonging to the community 202 and accordingly determine the neighbor set for the candidate community 212 as being the stable community 202.

Similarly, the community resolution engine 218 may identify the neighbor set for the candidate community 214 as being the stable communities 206 and 208, the neighbor set for the candidate community 216 as being the stable community 204, and the neighbor set for the candidate community 222 as being the stable communities 206 and 208.

Referring to decision block 306 of FIG. 3, the community detection system 210 (e.g., via the community resolution engine 218) may determine whether the neighbor set is empty. If so, the method 300 proceeds to block 308, in which the community resolution engine 218 may resolve the candidate community 212 as being a new stable community. The community detection system 210 (e.g., via the community resolution engine 218) may insert the new stable community into the database 220. In doing so, the number of stable communities has increased by one. From block 308, the method 300 proceeds to block 310.

Referring to block 310 of FIG. 3, the community detection system 210 (e.g., via the community resolution engine 218) may remove the candidate community from the set of candidate communities. The community resolution engine 218 may remove the candidate community from the set of candidate communities because the candidate community has been resolved at block 308.

Referring to block 312 of FIG. 3, after removing the candidate community at block 310 the community detection system 210 (e.g., via the community resolution engine 218) may determine whether there are any remaining candidate communities in the set of candidate communities. If not, the method proceeds to block 314, and end the method 300. If the community detection system 210 determines that there are any remaining candidate communities in the set of candidate communities, the method 300 returns to block 302, in which the community resolution engine 218 may select another candidate community for resolving (e.g., candidate community 214, 216, or 218 in the illustrative example).

Returning back to decision block 306, if the neighbor set is not empty, the method 300 proceeds from decision block 306 to block 316, in which the community resolution engine 218 may calculate a hash value of the candidate community 212. In an example, the community resolution engine 218 may apply a hash function on the user string {User1, User2, User3, and User5} of candidate community 212. For one or more stable communities included in the neighbor set, the community resolution engine 218 may calculate a hash value of the user string included in the respective stable community for comparison purposes.

Referring to decision block 318 of FIG. 3, the community detection system 210 (e.g., via the community resolution engine 218) may determine whether the hash value of the candidate community matches a hash value of a stable community included in the neighbor set. If so, the method 300 proceeds to block 320, in which the community resolution engine 218 may resolve the candidate community 212 as being the matching stable community. The community detection system 210 therefore identifies the candidate community with matching hash values as the matching stable community. The structure of the order in which users are included in the candidate community may be the same as the stable community. The method 300 may proceed from block 320 to block 310.

If instead at decision block 318 the community detection system 210 determines that the hash value of the candidate community does not match a hash value of a stable community included in the neighbor set, the method 300 proceeds to decision block 322, in which the community detection system 210 (e.g., via the community resolution engine 218) may determine whether the neighbor set includes only one stable community. If not, the method 300 proceeds to the block 324, which executes steps of method 400 in FIG. 4. If the community detection system 210 determines instead that the neighbor set does include only one stable community, the method 300 proceeds to the block 314.

Figure 4:
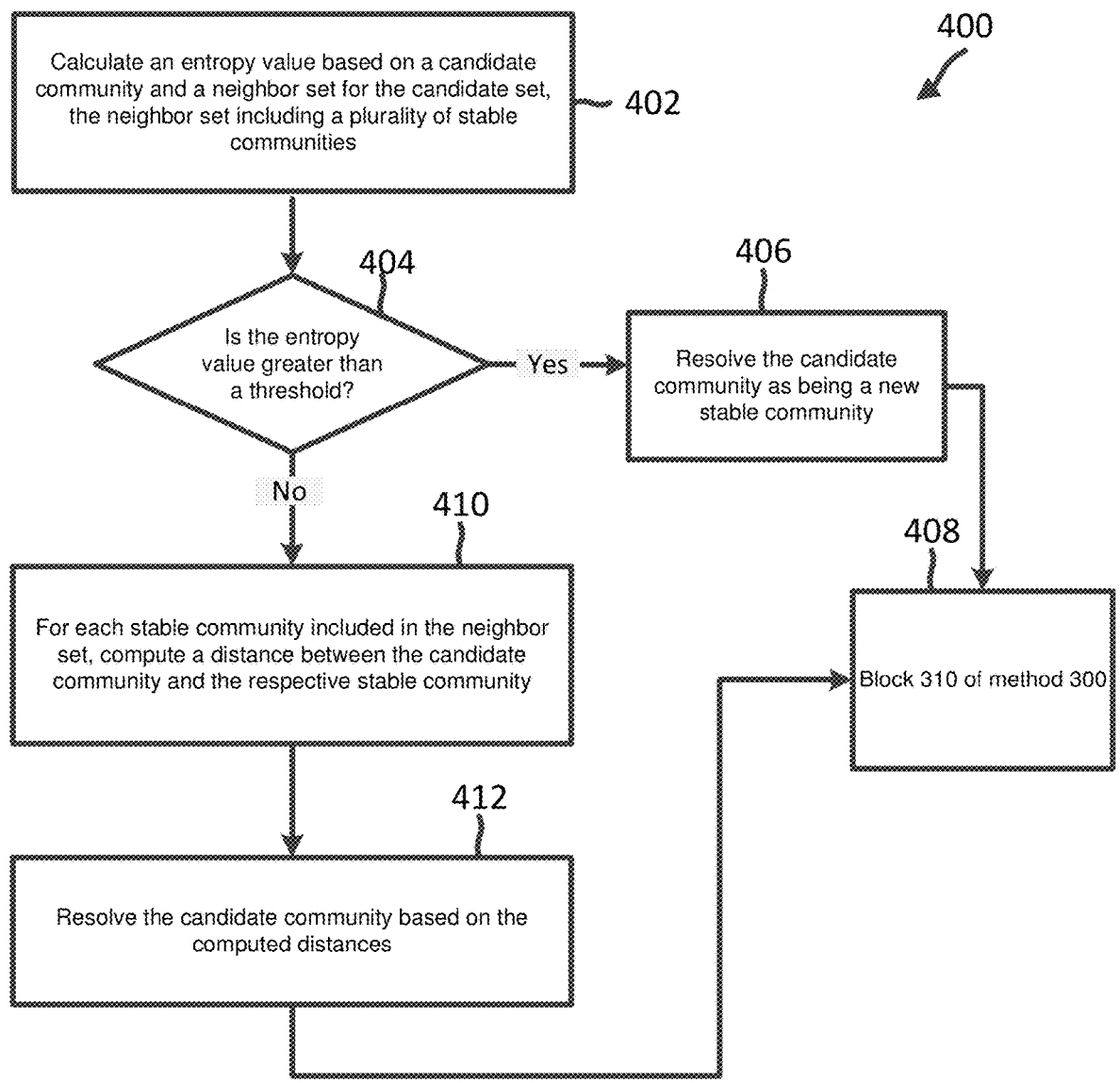
FIG. 4 is a flow diagram of a method of resolving a candidate community with a neighbor set according to aspects of the present disclosure.

FIG. 4 is a flow diagram of a method 400 of resolving a candidate community with a neighbor set including stable communities according to aspects of the present disclosure. For example, method 400 addresses aspects pertaining to how to resolve a candidate community where the neighbor set does not include one stable community (see decision block 322 above). Steps of the method 400 can be executed by a computing device (e.g., a processor, processing circuit, and/or other suitable component) or other suitable means for performing the steps. For example, the community detection system 210 may utilize one or more components to execute the steps of method 400. As illustrated, the method 400 includes a number of enumerated steps, but embodiments of the method 400 may include additional steps before, after, and in between the enumerated steps. In some embodiments, one or more of the enumerated steps may be omitted or performed in a different order.

Referring to block 402 of FIG. 4, the community detection system 210 (e.g., via the community resolution engine 218) may calculate an entropy value based on the candidate community 212 and a neighbor set for the candidate community, the neighbor set including a plurality of stable communities. For the candidate community and the plurality of stable communities included in the neighbor set, the community resolution engine 218 may determine the number of common users in the candidate community and a particular stable community and normalize this value to generate a probability distribution as an entropy value.

In an example, the community resolution engine 218 applies the following entropy function in accordance with the equation (1) below to generate the entropy value:

$$\text{For each } C_k \text{ in } M: \text{ Add} |U[C_k] \cap U[\bar{c}_k]|/(\Sigma_k^{k \in M}(|U[C_k] \cap U[\bar{c}_k]|) \text{ to } P\_vec \text{ Return Entropy}(P\_vec), \quad (1)$$

where $C_k = \{U_1, U_2, U_m, U_n, \ldots\}$ includes the stable community and its users, M is the neighbor set, $U[C_k]$ is a set of users of the community $C_k$, $U[\bar{c}_k]$ is a set of users of the candidate community, P_vec is the probability distribution, and Entropy(P_vec) is an entropy value that is returned by the entropy function for the community detection system 210 to use in resolving the candidate community. The P_vec parameter provides the total value of users in common between a candidate community and each of the plurality of stable communities, normalized by the total value, to result in the probability distribution function returned as the entropy value.

Referring to decision block 404 of FIG. 4, the community detection system 210 (e.g., via the community resolution engine 218) may determine whether the entropy value (e.g., a probability density function) is greater than a threshold.

The entropy value may be a statistical measure. In an example, the threshold may be at least 0.90 (e.g., 0.95).

An entropy value that is greater than the threshold may indicate a uniform distribution and accordingly a high uncertainty of whether the candidate community 214 is part of any of the stable communities included in the neighbor set (i.e., a low probability of matches in the sets). Accordingly, the method 400 proceeds to block 406 where the community resolution engine 218 may resolve the candidate community as being a new stable community due to the high uncertainty. The method 400 may proceed from block 406 to block 408.

Referring to block 408 of FIG. 4, the community detection system 210 (e.g., via the community resolution engine 218) may return back to method 300 and execute block 310.

Returning to decision block 404, an entropy value that is not greater than the threshold may indicate a non-uniform distribution (skewed distribution on one side) and accordingly a high probability that the candidate community 214 is part of a stable community included in the neighbor set. For example, if the entropy value is not greater than the threshold, then the candidate community and the plurality of stable communities may have a number of users in common. If the entropy value is not greater than the threshold, process flow may proceed to block 410, in which the community resolution engine 218 may for each stable community included in the neighbor set, compute a distance between the candidate community and the respective stable community. The community resolution engine 218 may compute these distances to find which the stable community that matches the best with the candidate community as compared to the other stable communities in the neighbor set. The method 400 may proceed from block 410 to block 412.

Referring to block 412 of FIG. 4, the community detection system 210 (e.g., via the community resolution engine 218) may resolve the candidate community based on the computed distances between the candidate community and the respective stable communities.

In an example for sake of illustration, the candidate community 214 has a neighbor set including the stable communities 202, 204, and 206. For each stable community, the community resolution engine 218 may generate two matrices having the same structure based on the user and entity access relationships in the candidate community 214 and the respective stable community. For example, the rows of each matrix may correspond to different files accessed by users in the community and the columns of each matrix may correspond to different users in the community that accessed the different files.

In an example, the first matrix has as the rows a union of the files in the candidate community 214 and the respective stable community and has as the columns a union of the users in the candidate community 214 and the respective stable community. For the first matrix, the community resolution engine 218 may place the access rate values from the respective stable community into the first matrix. Thus, for all users that accessed entities in the stable community, the values for those users' accesses will be entered. For users identified from the candidate community, their access rate values for any entities will not be entered in the first matrix. Thus, for any overlapping users between the communities, in the first matrix, only the access rate values from the users in the stable community are filled. For any non-overlapping users from the candidate community, a zero value is entered for all rows in that column.

For the second matrix, the community resolution engine 218 may copy the values from the candidate community 214. Thus, for all of the users that accessed entities in the candidate community, the values for those users' accesses will be entered. For users identified from the stable community, their access rate values will not be entered in the second matrix. Thus, for any overlapping users between the communities, in the second matrix, only the access rate values from the users in the candidate community are filled. For any non-overlapping users from the stable community, a zero value is entered for all rows in that column.

The community resolution engine 218 calculates the distance (e.g., matrix norms) between the first and second matrices. A Euclidean distance is an example of matrix norms. The community resolution engine 218 may create a vector including the computed distances between each of the stable communities and the candidate community.

The community resolution engine 218 may determine an overall minimum distance for the candidate community 214 and the stable communities included in the neighbor set. In an example, the community resolution engine 218 applies an algorithm to the distances to determine the overall minimum distance. In some examples, the algorithm may be the Hungarian formula. For example, in some embodiments a hungarian matrix may be formed on which the algorithm is run. The hungarian matrix may have as its rows the candidate communities generated in the new time window. The hungarian matrix may have as its columns the stable communities (thus, a union of all of the stable communities identified as neighbors to any of the candidate communities). The distances between the stable and candidate communities are entered in the appropriate slots. Where there is no distance value to be entered for a particular slot (e.g., because there was no distance measured between a particular candidate community and a particular stable community that was neighbor to a different candidate community), a value of infinity may be entered.

The algorithm may be run on this hungarian matrix. Accordingly, the community resolution engine 218 may determine an optimal match such that the overall distance is minimized. The result of the output (i.e., the stable community with the smallest distance) may be one of the stable communities included in the neighbor set. The columns corresponding to stable communities that have already been matched to one or more candidate communities may be removed from the hungarian matrix.

After block 412, the method 400 may proceed to the block 408, in which the block 310 of method 300 may be executed.

Although the disclosure may provide examples of file accesses for anomaly detection (e.g., file access rate), it should be understood that other and/or additional file operations (e.g., file deletion, file modification, etc.) are within the scope of the disclosure.

Figure 5:
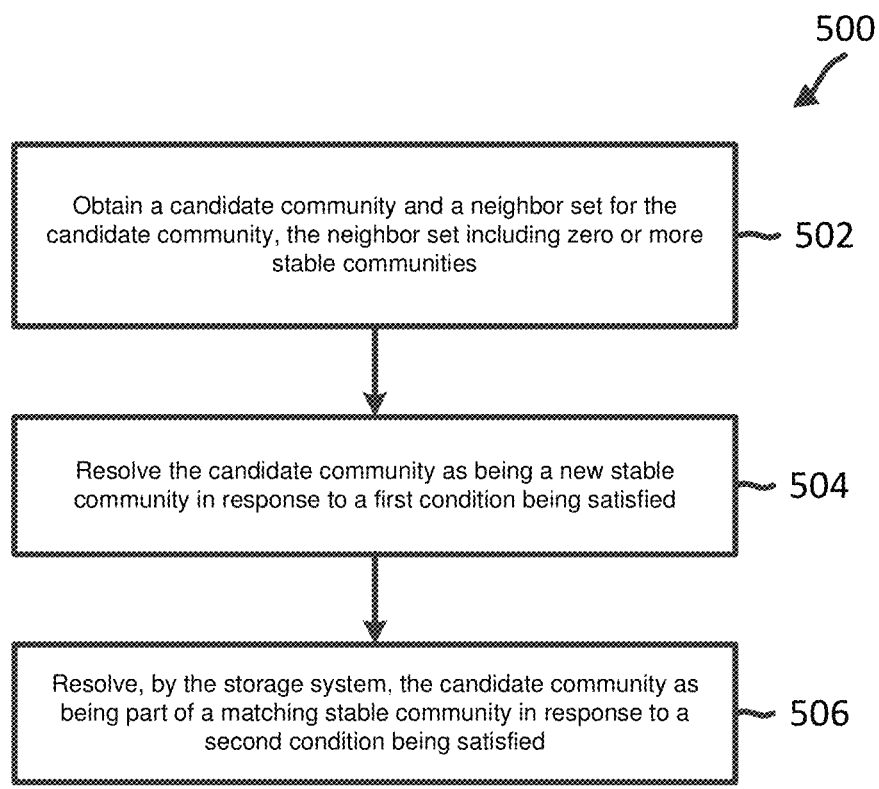
FIG. 5 is a flow diagram of a method of resolving a candidate community with a neighbor set according to aspects of the present disclosure.

FIG. 5 is a flow diagram of a method 500 of resolving a candidate community with a neighbor set according to aspects of the present disclosure. Steps of the method 500 can be executed by a computing device (e.g., a processor, processing circuit, and/or other suitable component) or other suitable means for performing the steps. For example, the community detection system 210 may utilize one or more components to execute the steps of method 500. As illustrated, the method 500 includes a number of enumerated steps, but embodiments of the method 500 may include additional steps before, after, and in between the enumerated steps. In some embodiments, one or more of the enumerated steps may be omitted or performed in a different order.

Referring to block 502 of FIG. 5, the community detection system 210 (e.g., via the community resolution engine 218) may obtain a candidate community and a neighbor set for the candidate community, the neighbor set including zero or more stable communities.

Referring to block 504 of FIG. 5, the community detection system 210 (e.g., via the community resolution engine 218) may resolve the candidate community as being a new stable community in response to a first condition being satisfied. The neighbor set may include a stable community.

In an example, the first condition is satisfied if the neighbor set is empty. In another example, the community resolution engine 218 calculates an entropy value based on the candidate community and the neighbor set. In this example, community resolution engine 218 may determine, based on the entropy value, whether the first condition is satisfied. In another example, the community resolution engine 218 determines whether an entropy value based on the candidate community and the neighbor set is greater than a threshold. The first condition may be satisfied if the entropy value is greater than the threshold. In another example, the community resolution engine 218 computes a distance between the candidate community and the neighbor set. The community resolution engine 218 may determine, based on the computed distance, whether the first condition is satisfied.

Referring to block 506 of FIG. 5, the community detection system 210 (e.g., via the community resolution engine 218) may resolve the candidate community as being part of a matching stable community in response to a second condition being satisfied. In an example, the community resolution engine 218 may compare a first hash value of the candidate community and a second hash value of a stable community included in the neighbor set. In this example, the second condition may be satisfied if the first and second hash values match. In another example, the community resolution engine 218 calculates an entropy value based on the candidate community and the neighbor set. The community resolution engine 218 may determine, based on the entropy value, whether the second condition is satisfied. In another example, the community resolution engine 218 computes a distance between the candidate community and the neighbor set. The community resolution engine 218 may determine, based on the computed distance, whether the second condition is satisfied.

After a community is formed, a user or file included in the community may become inactive. For example, a user may become inactive if the user does not access files included in the community within a threshold. In another example, a file may become inactive if no users or very few uses access the file within a threshold. The community resolution engine 218 may perform actions for determining whether a user or a file is active and/or inactive. The community resolution engine 218 maintains the access rate values in the database 220 and checks that the information in the database 220 is up-to-date.

In an example, the community resolution engine 218 may determine whether a user or a file is active in accordance with the following.

For example, if the current access rate is less than the prior value, then the prior value may be summed with the current access rate, with that summed result divided by what occurrence this is (e.g., if it is the second occurrence, divide it by 2). If, instead, the current access rate is greater than the prior access rate, the prior access rate is replaced with the current access rate. The community resolution engine 218 may determine whether a user or a file is active periodically and the community resolution engine 218 may select only those users or files that are active when resolving communities including the users and/or files. If the current access rate falls below a threshold (e.g., less than one), the community resolution engine 218 may remove the file from the community. If all the files for a user falls below the threshold, then the community resolution engine 218 may remove the user from the community.

Figure 6:
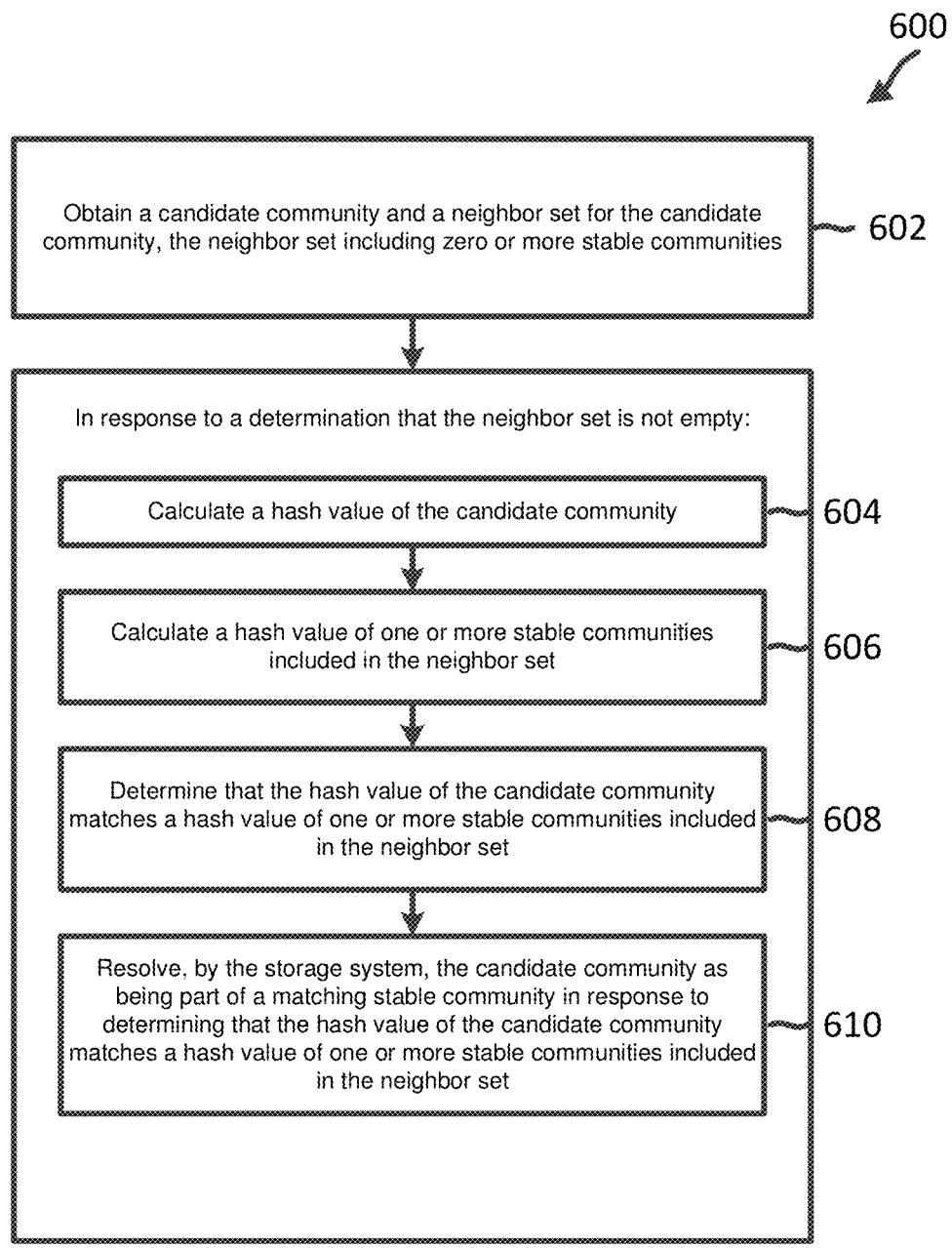
FIG. 6 is a flow diagram of a method of resolving a candidate community with a neighbor set according to aspects of the present disclosure.

FIG. 6 is a flow diagram of a method 600 of resolving a candidate community with a neighbor set according to aspects of the present disclosure. Steps of the method 600 can be executed by a computing device (e.g., a processor, processing circuit, and/or other suitable component) or other suitable means for performing the steps. For example, the community detection system 210 may utilize one or more components to execute the steps of method 600. As illustrated, the method 600 includes a number of enumerated steps, but embodiments of the method 600 may include additional steps before, after, and in between the enumerated steps. In some embodiments, one or more of the enumerated steps may be omitted or performed in a different order.

Referring to block 602 of FIG. 6, the community detection system 210 (e.g., via the community resolution engine 218) may obtain a candidate community and a neighbor set for the candidate community, the neighbor set including zero or more stable communities. In response to a determination that the neighbor set is not empty, the community detection system 210 may execute blocks 604, 606, 608, and 610. Referring to block 604 of FIG. 6, the community detection system 210 may calculate a hash value of the candidate community. Referring to block 606 of FIG. 6, the community detection system 210 may calculate a hash value of one or more stable communities included in the neighbor set. Referring to block 608 of FIG. 6, the community detection system 210 may determine that the hash value of the candidate community matches a hash value of one or more stable communities included in the neighbor set. Referring to block 608 of FIG. 6, the community detection system 210 may resolve, by the storage system, the candidate community as being part of a matching stable community in response to determining that the hash value of the candidate community matches a hash value of one or more stable communities included in the neighbor set.

As discussed, over time, the community detection system 210 may observe new accesses of entities by users within a subsequent time window. For example, during the subsequent time window, users may access entities and the community detection system 210 may form new communities based on the new accesses. Accordingly, the number of communities may increase and/or user membership within a community may change. Rather than create new communities, the community detection system 210 resolves the new candidate communities with stable communities to determine whether to resolve a candidate community as being a new stable community or as being part of a matching stable community. Such reconciliation may provide for more concise user-community relationships and the ability to detect malicious use using these relationships. For example, a security application may have access to the stored communities as well as information regarding access to entities. The security application may determine that some accesses are suspicious and flag the access as such or take other appropriate action.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system, method, and machine-readable storage medium for resolving candidate communities, where a candidate community is based on a common set of attributes. In some embodiments, the method includes obtaining, by a storage system, a candidate community and a neighbor set for the candidate community, the neighbor set including zero or more stable communities. The method also includes resolving, by the storage system, the candidate community as being a new stable community in response to a first condition being satisfied. The method further includes resolving, by the storage system, the candidate community as being part of a matching stable community in response to a second condition being satisfied.

In yet further embodiments, a non-transitory machine-readable medium has instructions for performing the method of resolving a candidate community, including machine executable code, which when executed by at least one machine, causes the machine to: obtain, by a storage system, a candidate community and a neighbor set for the candidate community, the neighbor set including zero or more stable communities; resolve, by the storage system, the candidate community as being a new stable community in response to a first condition being satisfied; and resolve, by the storage system, the candidate community as being part of a matching stable community in response to a second condition being satisfied.

In yet further embodiments, a computing device includes a memory containing a machine-readable medium comprising machine executable code having stored thereon instructions for performing a method of resolving a candidate community and a processor coupled to the memory. The processor is configured to execute the machine executable code to: obtain, by a storage system, a candidate community and a neighbor set for the candidate community, the neighbor set including zero or more stable communities; resolve, by the storage system, the candidate community as being a new stable community in response to a first condition being satisfied; and resolve, by the storage system, the candidate community as being part of a matching stable community in response to a second condition being satisfied.

In some embodiments, a method includes obtaining, by a storage system, a candidate community and a neighbor set for the candidate community, the neighbor set including zero or more stable communities; and in response to a determination that the neighbor set is not empty: calculating a hash value of the candidate community; calculating a hash value of one or more stable communities included in the neighbor set; determining that the hash value of the candidate community matches a hash value of one or more stable communities included in the neighbor set; and resolving, by the storage system, the candidate community as being part of a matching stable community in response to determining that the hash value of the candidate community matches a hash value of one or more stable communities included in the neighbor set.

In yet further embodiments, a non-transitory machine-readable medium has instructions for performing the method of resolving a candidate community, including machine executable code, which when executed by at least one machine, causes the machine to: obtain, by a storage system, a candidate community and a neighbor set for the candidate community, the neighbor set including zero or more stable communities; determine, by the storage system, a quantity of stable communities included in the neighbor set; and in response to a determination that the neighbor set includes a plurality of stable communities: calculate an entropy value based on the candidate community and the neighbor set; determine that the entropy value is greater than a threshold; and resolve the candidate community as being a new stable community in response to determining that the entropy value is greater than the threshold.

In yet further embodiments, a computing device includes a memory containing a machine-readable medium comprising machine executable code having stored thereon instructions for performing a method of resolving a candidate community and a processor coupled to the memory. The processor is configured to execute the machine executable code to: obtain a candidate community and a neighbor set for the candidate community, the neighbor set including a plurality of stable communities; determine that a hash value of the candidate community does not match at least one hash value of one or more stable communities of the plurality of stable communities; and calculate an entropy value based on the candidate community and the neighbor set.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine-readable medium having stored thereon instructions for performing a method, comprising machine executable code which when executed by at least one machine, causes the machine to:
   identify, by a storage system, a candidate community from a set of candidate communities, the candidate community being based on accesses of one or more entities by a first set of users;
   obtain, by the storage system, a neighbor set for the candidate community, the neighbor set including one or more stable communities that have previously been resolved and stored in a database, each stable community being based on accesses of one or more entities by a second set of users;
   determine, by the storage system, a quantity of stable communities included in the neighbor set; and
   in response to a determination that the quantity of stable communities included in the neighbor set includes a plurality of stable communities:
      calculate an entropy value based on users in common between the candidate community and the neighbor set, the entropy value being a statistical measure that is inversely proportional to a number of the users in common between the candidate community and the neighbor set;
      in response to a determination that the entropy value is greater than a threshold:

resolve the candidate community as being a new stable community; and
store the new stable community; and
in response to a determination that the entropy value is less than the threshold:
resolve the candidate community as being part of the one or more stable communities.

2. The non-transitory machine-readable medium of claim 1, further comprising machine executable code which causes the machine to:
remove the candidate community from the set of candidate communities.

3. The non-transitory machine-readable medium of claim 1, further comprising machine executable code which causes the machine to:
resolve the candidate community as being the new stable community based on a distance between the candidate community and each stable community included in the neighbor set.

4. The non-transitory machine-readable medium of claim 1, further comprising machine executable code which causes the machine to:
resolve the candidate community as being part of the one or more stable communities based on a distance between the candidate community and each stable community included in the neighbor set.

5. The non-transitory machine-readable medium of claim 1, further comprising machine executable code which causes the machine to:
determine, by the storage system, that a hash value of the candidate community matches a hash value of one or more stable communities included in the neighbor set.

6. A method, comprising:
identifying, by a storage system, a candidate community from a set of candidate communities, the candidate community being based on accesses of one or more entities by a first set of users;
obtaining, by the storage system, a neighbor set for the candidate community, the neighbor set including one or more stable communities that have previously been resolved and stored in a database, each stable community being based on accesses of one or more entities by a second set of users;
determining, by the storage system, a quantity of stable communities included in the neighbor set; and
in response to determining that the quantity of stable communities included in the neighbor set includes a plurality of stable communities:
calculating an entropy value based on users in common between the candidate community and the neighbor set, the entropy value being a statistical measure that is inversely proportional to a number of the users in common between the candidate community and the neighbor set;
in response to determining that the entropy value is greater than a threshold:
resolving the candidate community as being a new stable community; and
storing the new stable community; and
in response to determining that the entropy value is less than the threshold:
resolving the candidate community as being part of the one or more stable communities.

7. The method of claim 6, further comprising:
removing the candidate community from the set of candidate communities.

8. The method of claim 6, further comprising:
resolving the candidate community as being the new stable community based on a distance between the candidate community and each stable community included in the neighbor set.

9. The method of claim 6, further comprising:
resolving the candidate community as being part of the matching stable community based on a distance between the candidate community and each stable community included in the neighbor set.

10. The method of claim 6, further comprising:
determining, by the storage system, that a hash value of the candidate community matches a hash value of one or more stable communities included in the neighbor set.

11. A computing device comprising:
a memory containing a machine-readable medium comprising machine executable code having stored thereon instructions for performing a method of forming communities; and
a processor coupled to the memory, the processor configured to execute the machine executable code to:
identify a candidate community from a set of candidate communities, the candidate community being based on accesses of one or more entities by a first set of users;
obtain a neighbor set for the candidate community, the neighbor set including one or more stable communities that have previously been resolved and stored in a database, each stable community being based on accesses of one or more entities by a second set of users;
determine a quantity of stable communities included in the neighbor set; and
in response to a determination that the quantity of stable communities included in the neighbor set includes a plurality of stable communities:
calculate an entropy value based on users in common between the candidate community and the neighbor set, the entropy value being a statistical measure that is inversely proportional to a number of the users in common between the candidate community and the neighbor set;
in response to a determination that the entropy value is greater than a threshold:
resolve the candidate community as being a new stable community; and
store the new stable community; and
in response to a determination that the entropy value is less than the threshold:
resolve the candidate community as being part of the one or more stable communities.

12. The computing device of claim 11, wherein the processor is further configured to execute the machine executable code to:
remove the candidate community from the set of candidate communities.

13. The computing device of claim 11, wherein the processor is further configured to execute the machine executable code to:
resolve the candidate community as being the new stable community based on a distance between the candidate community and each stable community included in the neighbor set.

14. The computing device of claim 11, wherein the processor is further configured to execute the machine executable code to:

resolve the candidate community as being part of the matching stable community based on a distance between the candidate community and each stable community included in the neighbor set.

15. The computing device of claim 11, wherein the processor is further configured to execute the machine executable code to:

determine that a hash value of the candidate community matches a hash value of one or more stable communities included in the neighbor set.

* * * * *